United States Patent
Kemper

(10) Patent No.: US 8,261,483 B2
(45) Date of Patent: Sep. 11, 2012

(54) CRADLE FOR A FISHING ROD AND REEL

(76) Inventor: Michael Carroll Kemper, Sparks, NV (US)

(*) Notice: Subject to any disclaimer, the term of this patent is extended or adjusted under 35 U.S.C. 154(b) by 106 days.

(21) Appl. No.: 12/803,403

(22) Filed: Jun. 25, 2010

(65) Prior Publication Data

US 2011/0314722 A1  Dec. 29, 2011

(51) Int. Cl.
*A01K 97/10* (2006.01)
(52) U.S. Cl. .................. 43/21.2; 43/26; 43/54.1
(58) Field of Classification Search .............. 43/21.2, 43/54.1, 26; 206/315.11; 224/149, 677, 224/200, 251, 922, 920; *A01K 97/10, 97/04, A01K 07/08*
See application file for complete search history.

(56) References Cited

U.S. PATENT DOCUMENTS

| | | | | |
|---|---|---|---|---|
| 2,846,129 A * | 8/1958 | O'Brien | ......................... | 224/248 |
| 4,569,466 A * | 2/1986 | Webber | ......................... | 224/673 |
| 5,632,427 A * | 5/1997 | Gattuso et al. | ................ | 224/309 |
| 5,937,568 A * | 8/1999 | Morgan | ......................... | 43/21.2 |
| 6,805,270 B1 * | 10/2004 | Fraser | ........................... | 224/673 |
| 7,383,658 B1 * | 6/2008 | Reichert et al. | ................... | 43/26 |
| 2004/0089689 A1 * | 5/2004 | Lammerding | ................ | 224/673 |
| 2006/0064919 A1 * | 3/2006 | Fulop | ............................. | 43/21.2 |

* cited by examiner

*Primary Examiner* — Darren W Ark
*Assistant Examiner* — Thien Thanh Pham

(57) ABSTRACT

A receptacle that is removably attached onto a support means and is functional for supporting a fishing rod and reel therein in an upright vertical position. More particularly, the invention pertains to a cradle that is of a shape and size to firmly support the fishing rod and reel without the need for any type of brackets, bolts, straps, clips or the like. More importantly, the cradle is easily supported in a manner that allows the fisherman to freely move about without any interference from the rod and reel and further the invention is completely hands-free in function.

3 Claims, 2 Drawing Sheets

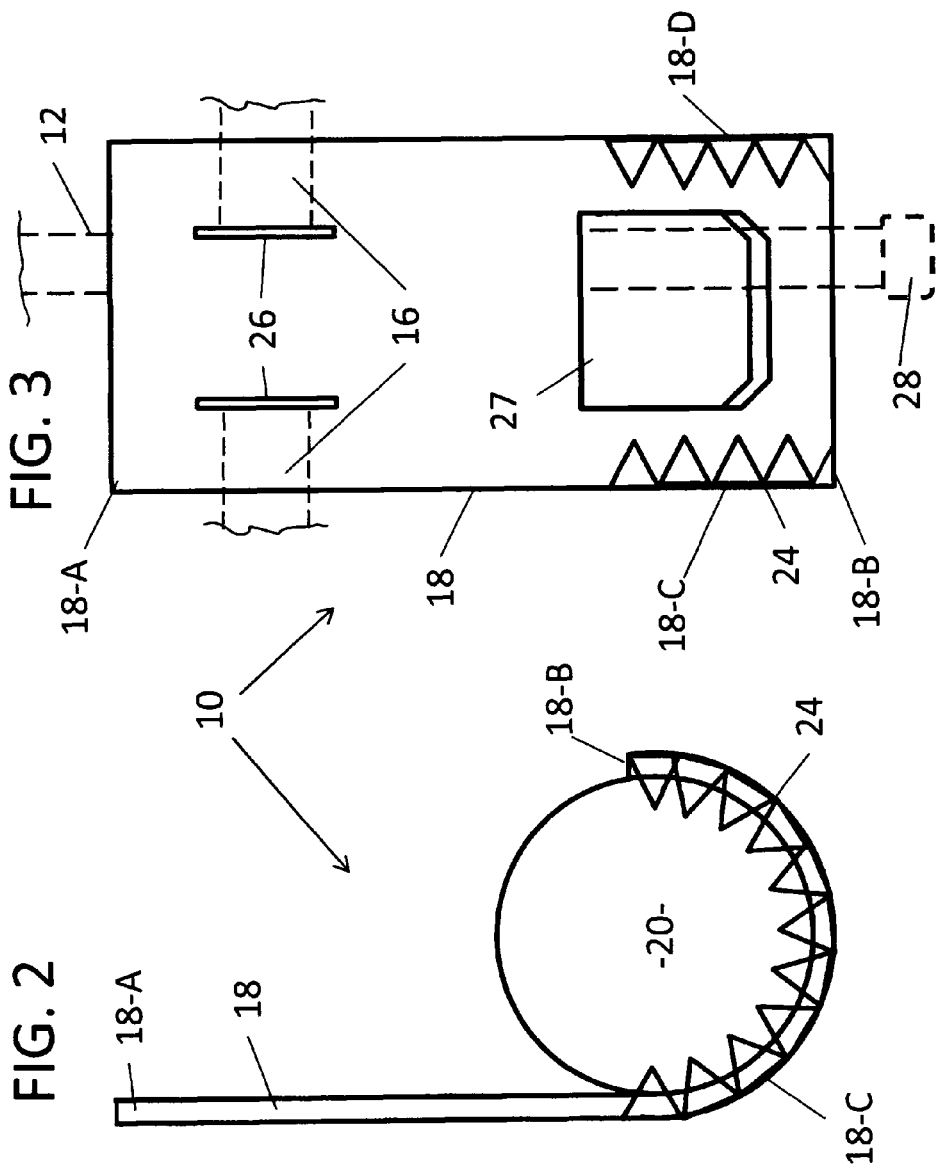

CRADLE FOR A FISHING ROD AND REEL

FIELD OF THE INVENTION

The present invention relates in general to a receptacle that is removably attached onto a support means and is functional for supporting a fishing rod and reel therein in an upright vertical position. More particularly, the invention pertains to a receptacle that is of a shape to firmly cradle the fishing rod and reel without the need for any type of brackets, bolts, straps, clips or the like. More importantly, the cradle is easily supported in a manner that allows the fisherman to freely move about without any interference from the rod and reel and further the invention is completely hands-free in function. Whereby, the fisherman can easily grasp the fishing line and manipulate and/or interchange fishing accessories thereon as the cradle easily supports the rod and reel in an upright vertical position. Whereby, the cradle eliminates the need for the fisherman to simultaneously hold the rod and reel while engaging in such activities.

BACKGROUND OF THE INVENTION

It is well known that fishing has become an extremely popular sport especially for leisure but also as a profession. In either case the fisherman most often utilizes a fishing rod and reel of which tend to be most cumbersome and awkward to carry. Fishing further requires numerous accessories including a fishing box, a fish net, a fish caddy, etc. As a result, the fisherman must manually carry all of the necessary items while walking to the fishing spot. This can be quite frustrating and inconvenient as it is very difficult to carry all of these items simultaneously. Therefore, to reduce some of the burden it would be most helpful if the fisherman did not have to hand carry the fishing rod and reel as well as all of the other additional paraphernalia. Furthermore, it is extremely difficult for the fisherman to hold the rod and reel while attempting to manipulate the fishing line while attaching hooks, lures, bait, flies, etc. Thus, it would be most advantageous to provide a simple means for hands-free support of the rod and reel while walking, while fishing and/or more importantly while attaching items onto the fishing line.

It is apparent that this is an extremely common problem of which needs to be addressed, recognized and resolved in a simple manner. Heretofore there have been numerous attempts to devise an acceptable solution yet nowhere in the known prior art have they successfully achieved this goal. The following are some examples of the known prior art.

U.S. Pat. No. 4,759,963 (Uso, Jr. et al.) discloses a fishing pole fastening device with an elasticized band for placing about a railing and a second band permanently attached crosswise to the elasticized band for fastening to a fishing pole. Both bands have a "Velcro" fastening mechanism so they can be formed into loops. While the device disclosed by Uso, Jr. et al. could be placed about a limb of a person, if it were placed on the arm or wrist of a fisherman, the free ends of the second band or the loop formed thereby could interfere with casting or get tangled with the fishing line, clothing or other equipment. Additionally, if one attempted to use the Uso, Jr. et al. device on the lower leg, it would be difficult to quickly and conveniently insert or simply drop the butt end of a fishing pole into the soft, flexible loop formed by the second band. The Uso, Jr. et al. pole capturing band is permanently attached to the elasticized band and the entire device must be detached from the railing to which it is attached to move it or a pole to another location.

U.S. Pat. No. 1,761,497 (Smith), U.S. Pat. No. 1,786,254 (Meehan), U.S. Pat. No. 2,846,129 (O'Brien) and U.S. Pat. No. 4,739,914 (Pothetes) disclose fishing rod holders of the type using rigid or semi-rigid jaws (Pothetes), spring-like clamps (O'Brien and Meehan) or clasps (Smith) to hold the butt or base portion of a fishing rod. The rod holding mechanisms of these devices cannot be separated easily from the base portion secured to the user.

U.S. Pat. No. 3,874,573 (Fruscella et al.), U.S. Pat. No. 4,569,466 (Webber), U.S. Pat. No. 5,024,018 (Ferrigno), U.S. Pat. No. 5,123,578 (Morse), U.S. Pat. No. 3,282,482 (Scharsu) and U.S. Pat. No. 5,386,932 (Gross) disclose holster type fishing rod holders designed to be secured to the belt of a fisherman. These devices are somewhat similar simply because they are attachable to a pre-existing waist belt but they are much too complicated and incorporate numerous parts such as bolts, nuts, springs, clamps, straps, etc. all of which the present invention eliminates.

U.S. Pat. No. 1,198,202 issued Sep. 12, 1916 discloses a fishing device to be worn by a fisherman so as to allow him to have his hands free. This is a multi-component rather complicated device which includes a harness worn by the fisherman together with a belt and an attached socket for holding the rod. Additionally, the rod must be supported by a chain attached to the harness. Because of all of the equipment involved, the apparatus is awkward and presents many protruding elements which are likely to hook the clothing, hands or arms of the fisherman.

Still further U.S. Pat. No. 1,174,319 discloses a fishing rod holder which comprises a belt and a metal body portion with a protruding rod holder which is also made of metal and which is adjustable in a vertical position relative to a ratchet which is a part of the mechanism. Again, this is complicated, and expensive relative to the materials to be used in making the device. Further, the rod holder always remains in the protruding position and presents a problem relative to snagging of clothing, hands and/or arms.

Another U.S. Pat. No. 1,786,254 issued Dec. 23, 1930 discloses a fishing rod holder attachable to the body of a person which includes a metal frame with an upstanding portion for accepting the butt end of the rod and two biased rollers through which the rod may be pressed downwardly. The rollers are biased by means of metal springs attached to the base plate. Again, this is a complicated arrangement and expensive relative to the materials used and the construction of the device, and also is in a protruding position.

With reference to the forgoing examples of prior art, it is clearly evident that numerous rod holders and holsters have been proposed for purposes of freeing the hands of the fisherman. Some supports also have been proposed to free the hands of the fisherman even while fishing. However, the various proposed supports have certain limitations relative to their usefulness both for baiting the hook, removing the fish and/or simply while walking. More importantly all of the known prior art supports have very complicated mechanisms, include costly materials and are simply not economical to construct Additionally, all of such holders known that are worn by the fisherman include elements which project outwardly and, therefore, are likely to catch the clothes of the wearer and/or scratch their arms and hands. Still further, every known prior art support is specifically designed for use with either a spin casting reel, a bait casting reel or spinning reel. None of the prior art references are functional for use with a fly fishing reel which is most important.

Namely, there are four types of fishing reels respectively. Each type of fishing reel is constructed differently and is functional for different types of fishing. For example, the spin-casting reel is a hybrid of sorts, sharing some elements of the spinning reel and some of the bait-casting reel. The spin-casting reel has a fixed spool that is attached parallel to your fishing rod and is capped off with a cone-shaped device through which your line runs. In this configuration the spin-casting reel is on the top of the rod. The thumb controls the release trigger and the crank is on the right side of the reel.

The spinning reel has a lot of the same advantages as the spin-casting reel. Like the spin-casting reel, the spinning reel relies on a fixed spool, but it is different in that the front of the reel is open. In this configuration the reel is mounted under the rod and the crank is on the left side. Many spinning reels have anti-reverse switches to ensure the handle doesn't turn when you don't want it to. To cast the reel, release this switch, pinch off the line slightly with your index finger, open the bail, and cast out, letting go of the line when your cast is pointing at the target.

The bait-casting reels look fairly primitive and winch-like. Bait-casting reels use a free spool rather than a fixed spool, which means that the crank mechanism can be disengaged from the cylinder when the line is cast, leaving the cylinder to spin with little drag. Affixed to the top of a rod, the bait-casting rod has its crank handle on the right side. Before casting the bait-casting reel you must set its free-spool button. When setting up your reel it is necessary to adjust the tension knob, but once you have your reel set up to a particular lure you need not do so again.

The fly-casting reel relies on an entirely different concept of casting than the other types of reels. Rather than casting out using the weight of the lure and sinker, the fly-casting reel uses lightweight lures made of small bits of feather and fur tied together and doesn't pull the line along after it. What this means is that the reel is designed to accommodate relatively thick and heavy line. There are very few mechanical parts to a fly-casting reel, since you want as little drag as possible on the line. The fly-casting reel is mounted below the rod on a foot and the crank handle is on the right. This type of reel does have a line guide and sometimes a drag adjuster, but it is basically a cylinder with a crank mechanism.

When considering the different types of fishing reels, it is to be understood that none of the prior art references are functional with the fly fishing reel. Due to their construction they are only functional for use with the standard casing reels. Such reels are slimmer and/or smaller and also have the handle and actuation mechanisms positioned differently than the fly fishing reel. The present invention is most functional with the fly fishing reel due to the construction, shape and size of the cradle which supports the rod and reel. The construction thereof is unique and novel as will be seen within the following specification and drawings.

OBJECTS AND ADVANTAGES OF THE PRESENT INVENTION

It is therefore a primary object of the present invention to provide a cradle for a fishing rod and reel that is of simple construction and does not require any additional type of brackets, bolts, straps, clips or the like. It is easily attached onto any standard type of waist belt normally worn with pants having belt loops. The cradle itself is substantially circular and simply supports the rod and reel due to the shape and size thereof.

Another object of the present invention is to provide a cradle for a fishing rod and reel that is formed basically from only three interconnected components, namely, an elongated central support member and two opposing circular side members, which in combination form the cradle. Therefore, the cradle is extremely cost effective to manufacture, economical to package, market and sell.

Still a further object of the present invention is to provide a cradle for a fishing rod and reel that is user friendly. The elongated central support member includes two slits for slidably receiving the waist belt there through so as to be very easily attached and adjusted. Thereafter the user simply inserts the rod and reel into the cradle and then the fisherman is free to move about without any interference from the rod and reel. Thus, allowing complete hands-free support of the rod and reel.

Yet another object of the present invention is to provide a cradle for a fishing rod and reel that can be made from any material of engineering choice. Such as but not limited to, leather, rubber, plastic, or any other suitable material. Also, the cradle can be made from plastic mould injection if preferred.

Still another object is to provide a cradle for a fishing rod and reel that can be easily economically manufactured, assembled, packaged and sold due to the simple construction thereof.

Other objects and advantages will be seen when taken into consideration with the following specification and drawings.

BRIEF DESCRIPTION OF THE DRAWINGS

FIG. 2 is substantially a right side view depicting the fishing rod and reel cradle.

FIG. 3 is substantially a back side view of the fishing rod and reel cradle depicting the aperture for the fishing rod handle.

DETAILED DESCRIPTION OF THE DRAWINGS

Figure 1:
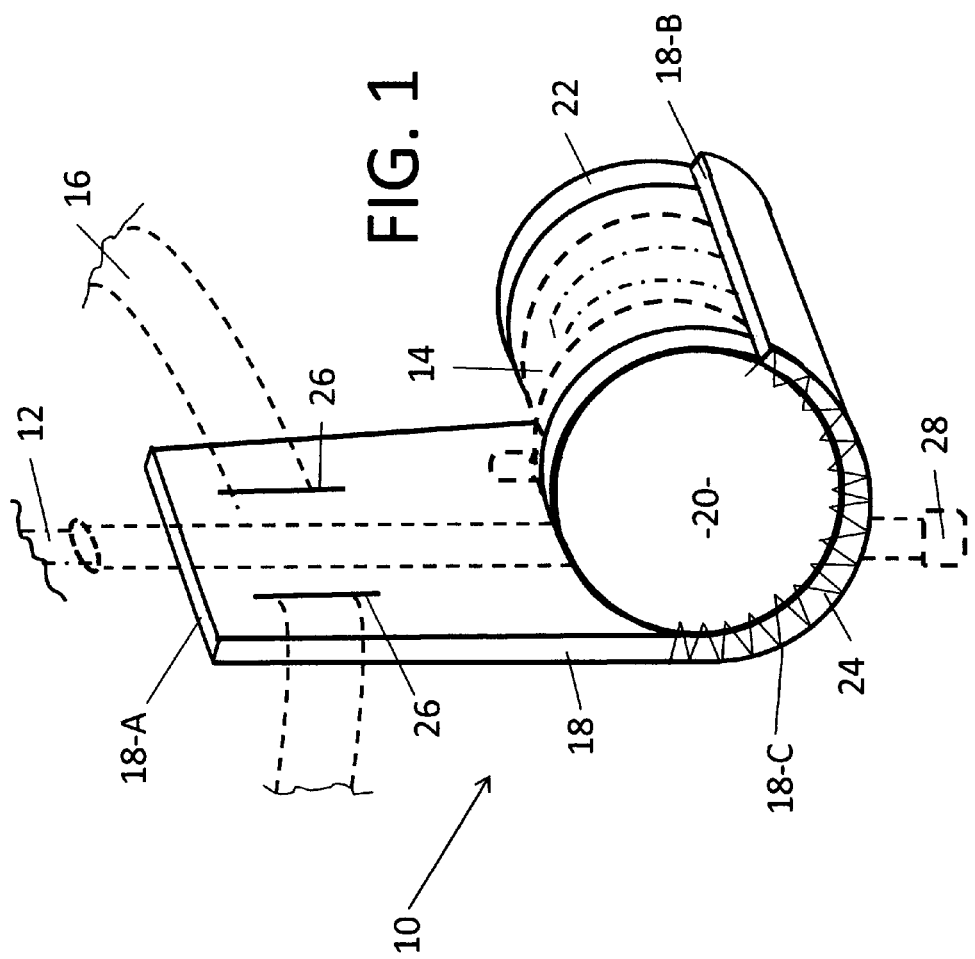
FIG. 1 is substantially a perspective overview depicting the preferred embodiment for the present invention.

Referring now in detail to the drawings wherein like characters refer to like elements throughout the various views. FIG. 1 illustrates the preferred embodiment for the cradle (10) of the present invention for support of a fishing rod (12) and the fishing reel (14) when the cradle (10) is attached onto a fisherman's waist belt (16). It is to be understood the fishing rod (12), the fishing reel (14) and the waist belt (16) are illustrated in ghost lines as these components are pre-existing standard components of which are purchased separately from the fishing rod and reel cradle (10). Therefore, any suitable waist belt (16), fishing rod (12) and the fishing reel (14) of user choice may be used in combination with the fishing rod and reel cradle (10). However, it is to be noted the preferred fishing rod (12) and fishing reel (14) are of the standard fly fishing rod and reel type as previously described.

The present invention, namely, the fishing rod and reel cradle (10) is of a shape and size to slid ably receive and support the standard fly fishing rod and reel due to the circular design which has a mating relationship with the circular type of fly fishing reel, respectively. Due to the shape and size of the cradle (10) and the fly fishing reel (14) the fishing rod and reel can be easily manually inserted and supported within the cradle (10) without the need for any type of fasteners, straps, clips, or the like. This is important as all of the known prior art cannot be utilized without the need for such additional components and/or accessory items. Whereby, the present invention has been made simpler without any loss of capability.

Referring now in general to the overall simplified construction for the fishing rod and reel cradle (10) which is formed from only three interconnecting members. Namely, the fishing rod and reel cradle is formed from one elongated rectangular first member (18) having an upper end (18-A), a lower end (18-B) a left edge intermediate section (18-C) and a right side intermediate section (18-D), respectively. Note, intermediate section (18-C) is shown in FIGS. 1-3 and intermediate section (18-D) is only shown in FIG. 3. The second member (20) functions as a left side support element that is positioned vertically onto the left side of the first member (18) and attached onto the lower end (18-B) and throughout the left edge intermediate section (18-C) of the first member (18), respectively. The third member (22) functions as a right side support element that is positioned vertically onto the right side of the first member (18) and attached onto the lower end (18-B) and throughout the right edge intermediate section (18-D) of the first member (18), respectively. The second and third members can be of any shape of engineering choice. However, if the second and third members are circular in shape, this is most functional and aesthetically appealing. Whereby, when the second and third members (20 & 22) are attached in place they are parallel and spaced apart from each other yet interconnected via the first member (18). Thus, the first, second and third members (18, 20 & 22) in combination form an open compartment which is of a shape and size to slid ably receive and support the fishing reel (14) therein.

Referring now to FIG. 2, wherein the right side of the cradle (10) is depicted and more clearly defines how each of the members (18, 20 & 22) are fixedly attached together. It is to be understood any suitable type of attachment means of engineering choice is inherent and the invention is not limited to any specific type thereof for interconnecting the members together. Thus, in FIGS. 1-3 as illustrated the attachment means can simply be decorative stitching (24) or the like. Other attachment means may include glue, rivets, staples, etc. however decorative stitching is aesthetically pleasing, cost efficient and most functional.

Referring now to FIG. 3, wherein the backside of the cradle (10) is illustrated. As depicted a partial section of the upper end (18-A) of the elongated rectangular first member (18) further includes a pair of slits (26) which are of a shape and size to slid ably receive a waist belt (16) there through for attaching the fishing rod and reel cradle (10) onto the waist (not shown) of the fisherman. It is to be understood the slits (26) are each of a shape and size to easily receive substantially any belt of user choice. Or any other support structure having a length to extend around the waist of the user may be utilized. As further depicted in FIG. 3, the first member (18) includes a centralized sectional aperture (27) of which allows the fishing rod handle (28) to extend downward there through and throughout. Whereby, the fishing rod (12) with the fishing rod handle (28) and the fishing reel (14) when positioned and supported within the cradle (10) are held in a secure manner. It is to be noted the aperture (27) is very important as it allows for the fishing rod (12) with the fishing rod handle (28) and the fishing reel (14) to automatically assume a vertical upright position which is critical for proper function of the invention. Whereby, when the fishing rod (12) with the fishing rod handle (28) and the fishing reel (14) are positioned and supported within the cradle (10) they are each in vertical substantially parallel alignment with the fisherman while in a standing position and/or while walking. Thus, the vertical position provides complete comfort and unobtrusive use of the invention when worn by the user and this is most advantageous and important for user friendliness.

It can now be seen the invention as disclosed herein is novel, simple in construction, easy to manufacture, sell and market. It can be made from many different materials of choice, is lightweight and most functional in use unlike any of the known prior art.

Although the invention has been herein shown and described in what is conceived to be the most practical and preferred embodiment, it is recognized that departures may be made there from within the scope and spirit of the invention, which is not to be limited to the details disclosed herein but is to be accorded the full scope of the claims so as to embrace any and all equivalent devices and apparatuses.

What I claim as new and wish to secure by Letters Patent is:

1. A fishing rod and reel cradle comprising in combination: a first member having an upper end, a lower end, a left edge intermediate section and a right edge intermediate section, said first member is rectangular in shape, a second member which functions as a left side support element is positioned vertically and attached onto said lower end and throughout said left edge intermediate section of said first member by attachment means, a third member which functions as a right side support element is positioned vertically and attached onto said lower end and throughout said right edge intermediate section of said first member by attachment means, said second member and said third member are parallel and spaced apart from each other yet interconnected via said first member, said second member and said third member are identical in size and each are shaped in the form of a solid circle, said second member and said third member are secured in a fixed vertical and horizontally aligned position with each other yet spaced apart, said second member and said third member are equally distanced away from said upper end yet vertically and horizontally fixedly aligned with each said end, each said member in combination form an open compartment, said open compartment is of a shape and size to slid ably receive and support a fishing reel therein, a partial section of said upper end includes a pair of slits which are of a shape and size to slid ably receive a waist belt there through, said pair of vertical slits are distanced away and equally spaced from said second member and said third member in vertical alignment, said pair of vertical slits are distanced away and equally spaced from each said end and said first member includes a centralized sectional aperture of which allows a fishing rod handle to extend downward there through and throughout, whereby, a fishing rod with said fishing rod handle and said fishing reel when positioned and supported within said rod and reel cradle when said rod and reel cradle is supported by said waist belt are held in a secure vertical upright position and said pair of vertical slits, said second member, said third member, said fishing rod with said fishing rod handle and said fishing rod reel and each said intermediate section are irregularly distanced apart yet in vertical alignment.

2. The fishing rod and reel cradle of claim 1 wherein said fishing rod with said fishing rod handle and said fishing reel is a standard fly fishing rod and reel.

3. The fishing rod and reel cradle of claim 1 wherein each said attachment means is either decorative-stitching, glue, rivets or staples.

* * * * *